F. HASBROOK.
Wheel-Plows.

No. 144,453.

Patented Nov. 11, 1873.

Witnesses:
A. W. Almqvist
(signature)

Inventor:
F. Hasbrook
Per (signature)
Attorneys.

UNITED STATES PATENT OFFICE.

FRED HASBROOK, OF STOKES' MOUND, MISSOURI.

IMPROVEMENT IN WHEEL-PLOWS.

Specification forming part of Letters Patent No. 144,453, dated November 11, 1873; application filed September 6, 1873.

*To all whom it may concern:*

Figure 1:
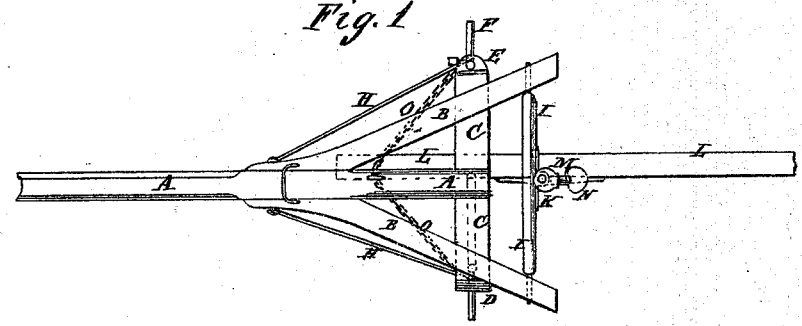
Figure 2:
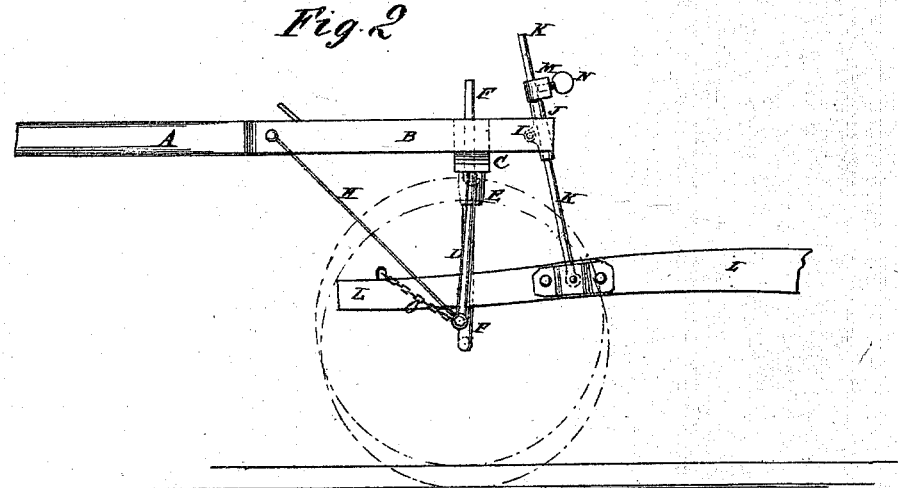
Figure 3:
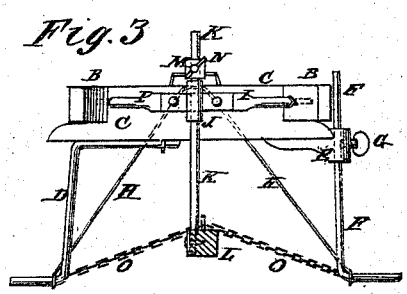

Be it known that I, FRED HASBROOK, of Stokes' Mound, in the county of Carroll and State of Missouri, have invented a new and useful Improvement in Wheel-Plow, of which the following is a specification:

Figure 1 is a top view of the frame-work of a wheel-plow, illustrating my improvement. Fig. 2 is a side view of the same. Fig. 3 is a rear view of the same.

Similar letters of reference indicate corresponding parts.

My invention has for its object to improve the construction of the wheel-plow for which Letters Patent No. 138,329 were granted to me, April 29, 1873, so as to make it more convenient in use and more effective in operation.

The invention relates to an arrangement of a rocking bar and pivoted rod in connection with the tongue and beam of the machine, for the purpose of adjusting them at certain angles to each other, as hereinafter described.

A is the tongue, B are the hounds or braces, and C is the axle-tree. To one end of the axle-tree C is attached a crank-axle arm, D. To the other end of the axle-tree C is attached a socket, E, through which passes the axle-arm F, which is secured in place by a set-screw, G, so that the axle-arm F may be raised and lowered to keep the machine level when plowing deep and when plowing shallow. The axle-arms D F are strengthened by braces H, the rear ends of which are attached to said axle-arms at or near the inner ends of their journals, and the forward ends of which are attached to the tongue A at or near the forward ends of the hounds B. The hounds B project in the rear of the axle-tree C, and to and between their rear ends is pivoted the rock-bar I, to the middle part of which is attached a socket, J, through which passes the rod K, the lower end of which is pivoted to the plow-beam L. The rod K is allowed to move upward through the socket J; but its downward movement is limited by a collar, M, placed upon it, and adjustably secured in place by a set-screw, N. O are two chain-braces, the forward ends of which are secured to the upper side of the forward end of the plow-beam L, and their rear ends are secured to the axle-arms D F at or near the inner ends of their journals. By this construction the chain-braces in drawing the sulky tend to press the forward end of the plow-beam L downward, and thus cause the plow to run deeper in the ground.

Having thus described my invention, I claim as new and desire to secure by Letters Patent—

The combination of rocking bar I and rod K with bifurcated tongue A B and beam L, as and for the purpose specified.

FRED HASBROOK.

Witnesses:
CHAS. E. HASBROOK,
FRANCIS MARION CRAWFORD.